United States Patent [19]

Hubert

[11] Patent Number: 4,884,185
[45] Date of Patent: Nov. 28, 1989

[54] PULSE WIDTH MODULATION CONVERTER

[75] Inventor: Cornilleau Hubert, Saint Germain En Laye, France

[73] Assignee: La Telemecanique Electrique, France

[21] Appl. No.: 287,200

[22] PCT Filed: Mar. 25, 1988

[86] PCT No.: PCT/FR88/00156
§ 371 Date: Nov. 29, 1988
§ 102(e) Date: Nov. 29, 1988

[87] PCT Pub. No.: WO88/07784
PCT Pub. Date: Oct. 6, 1988

[30] Foreign Application Priority Data

Mar. 30, 1987 [FR] France .................. 87 04371

[51] Int. Cl.[4] ............................. H02M 5/44
[52] U.S. Cl. .................. 363/56; 363/37; 323/222
[58] Field of Search .............. 363/41, 35, 37, 51, 363/56, 57, 58, ; 323/222

[56] References Cited

U.S. PATENT DOCUMENTS

| 3,379,955 | 4/1968 | Koetsch . | |
|---|---|---|---|
| 3,569,819 | 3/1971 | Martzloff et al. | 363/58 |
| 4,378,533 | 3/1983 | Carnel | 363/37 |
| 4,670,830 | 6/1987 | Peppel | 363/57 |
| 4,763,239 | 8/1988 | Ball | 363/58 |

FOREIGN PATENT DOCUMENTS 59-198897 11/1984 Japan .
81/03722 12/1981 World Int. Prop. O. .

OTHER PUBLICATIONS

S. Manias et al., "An SMR Topology with Suppressed DC Link Components and Predictive Line Current Wave Shaping", Conference Record of 1986 IEEE Industry Applications Society Annual Meeting, Part I, Denver, Col., (U.S.), Sep. 28–Oct. 3, pp. 630–639.

Primary Examiner—Peter S. Wong
Attorney, Agent, or Firm—William A. Drucker

[57] ABSTRACT

Converter, particularly frequency-converter, with pulse width modulation. The losses of the converter are reduced by providing in one of the leads (17, 18) connecting the direct voltage source (12) to the inverter (15) an inductance (L) as an aid to the conduction of all static switches (T1–T6); in parallel to the arms (B1–B3) of the inverter, a transfer capacitor ($C_L$) in series with a transfer diode ($D_L$) to receive the inductance energy during the blocking of the static switches; a resistance ($R_L$) for the discharge of the transfer capacitor, connected to the lead (17, 18) connecting the direct voltage source (12) to the inverter (15).

4 Claims, 1 Drawing Sheet

PULSE WIDTH MODULATION CONVERTER

The present invention relates to an electric energy converter, more particularly a frequency converter, operating by pulse width modulation—abbreviated to PWM—and connectable to a load for varying the energy delivered thereby.

Known frequency converters for synchronous or asynchronous motors generally comprise a rectifier bridge connected to an inverter through an intermediate circuit having a smoothing capacitor. The inverter must be connected to the phase windings of the motor and it operates by pulse width modulation. The inverter has several arms each of which is equipped with two static switches including respective recovery diodes. The middle point of each pair of switches of the same arm is connected to a respective phase winding of the motor. A control circuit enables or disables the switches at chosen times. By static switches is meant in the present description bipolar or MOS transistors, bipolar MOS components such as those known under the name IGT, thyristors of the GTO type which can be disabled or other similar components able to be disabled.

If we assume that the first switch of an arm is disabled and that the second switch of the same arm is not yet conducting, the current which transmits through the phase winding of the motor connected to the middle point of the arm passes through the recovery diode associated with the first switch. When the second switch is enabled and during the recovery time of the first diode, this switch is subjected to the passage of the reverse current of the first diode at the same time as the passage of the current of a winding of the motor and, as long as the voltage at the terminals of the switch has not dropped to a conduction value $V_{CESAT}$, high switching losses can be observed.

Of course, the switching losses increase with the operating frequency of the converter. Now, this frequency is related to the value of the inductances of the motor and it must be all the higher the smaller the inductances. In the case of a synchronous motor, this is precisely the case and it is therefore necessary to use a high switching frequency with correspondingly not inconsiderable switching losses. On the other hand, in the case of an asynchronous motor, and although the inductances of this latter are relatively high, a tendency can be observed for increasing the frequency of the converter so as to reduce the pulsating couple and the noise, which again results in an increase of the switching losses.

In a known arrangement for reducing the switching losses, the converter comprises in series with each switch an inductance and in parallel with each switch a resistance-capacity-diode network RCD. Each inductance contributes to limiting the transient current passage previously mentioned on enabling the switch whereas, when this latter is disabled, the energy stored in the inductance charges the capacity through the diode, the capacity then being discharged through the resistance. This arrangement has the drawback of requiring for each switch an inductance and an auxiliary RCD network. In addition, it does not allow integrated bridges to be used including switches interconnected with their recovery diodes.

The present invention aims at overcoming these drawbacks by efficiently reducing the switching losses of a pulse width modulation converter—more particularly a frequency converter—by means of a simple device, with a small number of components and a reduced cost.

The expression PWM converter designates any variable voltage generator with modulated pulse width such as a frequency converter for a synchronous or an asynchronous motor, a converter for a DC motor, an inverter delivering an AC voltage etc.

The object of the invention is in addition to make it possible in some cases to recover the residual switching losses occurring in the modulator bridge of the converter.

According to the invention, the converter includes, in one of the conductors connecting the intermediate circuit to the modulator bridge, an inductance for assisting in causing conduction of the static switches of the bridge and, in parallel with the arms of the bridge, a transfer capacitor in series with a diode for absorbing the energy delivered by the inductance when the static switches are disabled whereas a resistor is provided for discharging the transfer capacitor.

This resistor may be disposed in parallel with the transfer diode: it is preferably disposed in parallel with the series circuit formed of the conduction assisting inductance and the transfer diode, which means that the transfer capacitor discharges into the smoothing capacity associated with the DC voltage circuit upstream of the inverter.

In an advantageous embodiment of the converter of the invention, a high capacity clipping capacitor is disposed in parallel with the transfer capacitor for storing the surplus energy in the case of a short circuit, whereas a discharge resistor is associated with this clipping capacitor. The result is that a transfer capacitor of reduced capacity can be used and a clipping capacitor with low effective current, which reduces the cost price of the converter.

In addition, a chopped power supply may be advantageously connected to the terminals of the transfer capacitor and/or of the clipping capacitor so as to recover a part of the switching energy of the static switches for supplying the control circuit of the switches, even restoring the energy upstream of the converter.

One embodiment will be described hereafter by way of non limitative example, with reference to the accompanying drawings.

Figure 1:
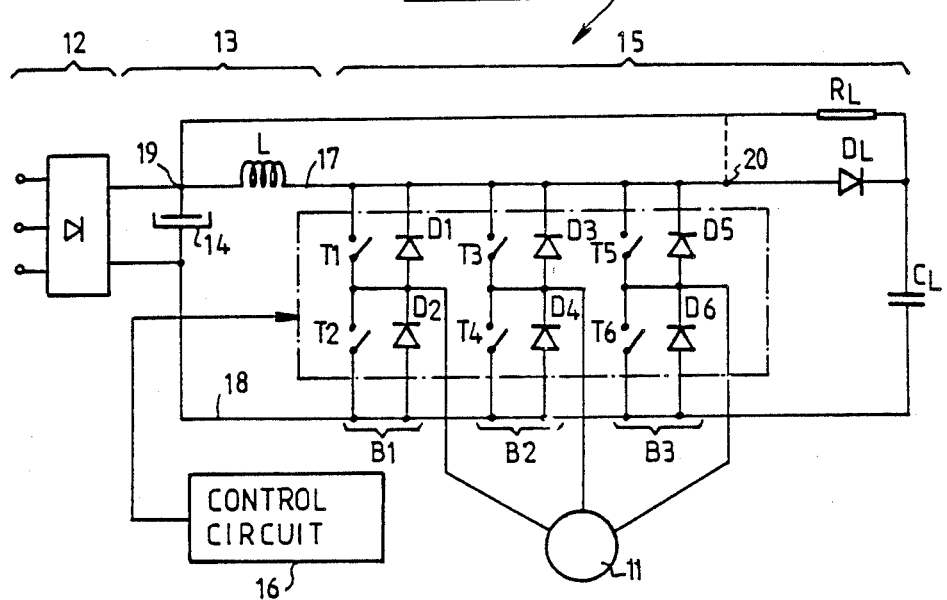
FIG. 1 shows schematically one embodiment of the converter of the invention.

The converter 10 of FIG. 1 is a pulse width modulation PMW frequency converter which is associated with a load formed for example by a synchronous motor 11.

Converter 10 usually includes a rectifier bridge 12 connected to the phase conductors of the mains, an intermediate DC voltage circuit 13 having a smoothing capacitor 14 and an inverter 15 connected to the rectifier bridge through the intermediate circuit. The inverter has three arms B1, B2, B3 each connected to a phase winding of the synchronous motor 11.

Each arm B1-B2-B3 of inverter 15 is equipped with two static switches T1, T2 for B1; T3, T4 for B2; T5, T6 for B3, having respective recovery diodes D1-D6.

The middle point of each pair of switches of the same arm is connected to a respective phase winding of the motor. A control circuit 16 enables and disables the switches T1-T6 at chosen times.

In accordance with the invention, an inductance L for assisting the starting of conduction of the static switches T1-T6 is disposed in one of the conductors 17-18 which connect the rectifier bridge 12—or the intermediate circuit 13—to the inverter 14. A transfer capacitor $C_L$ is disposed in parallel with arms B1-B3 of the inverter, this capacitor being in series with a transfer diode $D_L$ for receiving the energy from inductance L when the different static switches T1-T6 are disabled. A resistor $R_L$ for discharging the transfer capacitor $C_L$ is disposed between this latter and a point 19 of conductor 17 upstream of inductance L. Less advantageously, resistor $R_L$ could be connected to a point 20 of conductor 17 downstream of the inductance as shown with broken lines in FIG. 1.

Figure 2:
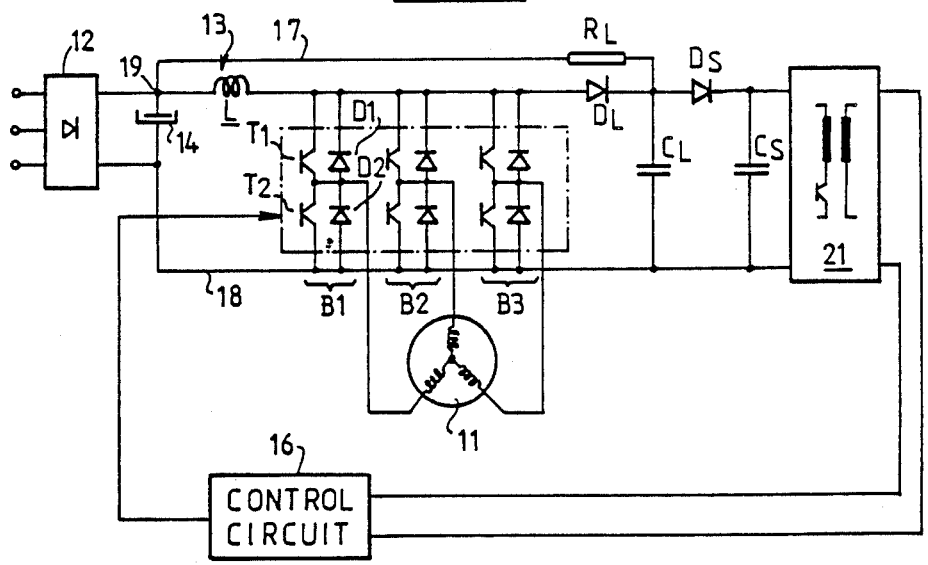
FIG. 2 shows a preferred embodiment of the converter of FIG. 1.

In the preferred variant of FIG. 2, a clipping capacitor $C_S$—or short circuit limiter—is disposed in parallel with the transfer capacitor $C_L$ whereas a diode $D_S$ is associated with this capacitor for charging it in the case of an accidental short circuit of the motor or in the case of the simultaneous conduction of two switches of the same arm.

In a more expensive variant, a single capacitor $C_L$ having both a high current characteristic and high capacity could be substituted for the capacitor $C_L$ and $C_S$ described above.

The operation of the device of FIG. 2 is as follows. With the switching frequency high, the transfer capacitor $C_L$ goes through charging and discharging cycles at the same frequency: for this a capacitor is used with a high effective current but low capacity so as to limit the cost and the size thereof. Should a short circuit occur, the clipping capacitor $C_S$ absorbs the energy stored in the inductance L; it has a high capacity for that but during normal operation does not need to withstand a high effective current. A part of the switching energy stored by the transfer capacitor $C_L$ is recovered by a chopped power supply 21 connected to the control circuit 16, capacitor $C_L$ or $C_S$ thus forming the input capacitor of this power supply.

I claim:

1. A pulse width modulation converter for delivering variable electric energy to an inductive load, said converter including:
    (i) a DC voltage source;
    (ii) an inverter having a plurality of arms connected in parallel across first and second leads each having input and output terminals, each of said arms including first and second static switches seriallyconnected across said leads and first and second recovery diodes respectively connected across said first and second switches, the second switch of each arm having a common point which is connected to the inductive load;
    (iii) a control circuit connected to said inverter for driving said inverter in pulse with modulation;
    (iv) an inductance connecting said DC voltage source to the input terminal of said first lead;
    (v) a serial circuit comprising a transfer capacitor ($C_L$) in series with a transfer diode ($D_L$) connecting the output terminal of said first lead to the output terminal of the second lead;
    (vi) a transfer capacitor discharge resistor connecting the DC voltage source to the common point between said diode and said transfer capacitor, and
    (vi) means connecting said DC voltage source to the input terminal of said lead.

2. A converter according to claim 1, wherein said resistor is connected to the first conductor upstream of said inductance.

3. A converter according to claim 1, wherein a clipping capacitor of capacity higher than that of said transfer capacitor is connected in parallel across said transfer capacitor through a diode.

4. A converter according to claim 3, wherein a chopped power supply (21) is connected across said transfer capacitor or across said clipping capacitor.

* * * * *